(12) United States Patent
Pitschel et al.

(10) Patent No.: US 10,769,669 B2
(45) Date of Patent: *Sep. 8, 2020

(54) DETERMINING AN INVITATIONAL CONTENT ITEM TYPE BASED ON PREDICTED USER ATTENTION

(71) Applicant: Apple Inc., Cupertino, CA (US)

(72) Inventors: Donald W. Pitschel, San Francisco, CA (US); Imran A. Chaudhri, San Francisco, CA (US); Lucas Newman, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 671 days.

This patent is subject to a terminal disclaimer.

(21) Appl. No.: 15/219,452

(22) Filed: Jul. 26, 2016

(65) Prior Publication Data

US 2016/0335671 A1    Nov. 17, 2016

Related U.S. Application Data

(63) Continuation of application No. 13/753,461, filed on Jan. 29, 2013, now Pat. No. 9,426,242.

(51) Int. Cl.
*G06Q 30/02* (2012.01)
*H04L 29/06* (2006.01)
(Continued)

(52) U.S. Cl.
CPC ..... *G06Q 30/0267* (2013.01); *G06Q 30/0202* (2013.01); *H04L 65/1089* (2013.01);
(Continued)

(58) Field of Classification Search
None
See application file for complete search history.

(56) References Cited

U.S. PATENT DOCUMENTS 6,505,169 B1 *  1/2003  Bhagavath ............. G06Q 30/02
                                               705/14.66
7,284,201 B2   10/2007  Cohen-Solal
                        (Continued)

FOREIGN PATENT DOCUMENTS

WO    2008051472    5/2008
WO    2011067675    6/2011

OTHER PUBLICATIONS

"Frequently Asked Questions/Gimbal", http://www.gimbal.com/faq/, 2013 Qualcomm Labs, Inc., 10 pages.
(Continued)

*Primary Examiner* — Backhean Tiv
(74) *Attorney, Agent, or Firm* — Polsinelli PC

(57) ABSTRACT

A media channel can include a mix of media items and invitational content items. At some point during the playback of the media channel an invitational content item can be presented. In some cases, the invitational content items eligible for presentation can be of differing types, such as video and audio. In can be advantageous to restrict presentation of video invitational content items to times when a user is likely to view the screen of the client device during playback of the invitational content item. To accomplish this one or more heuristics or rules can be applied to client device data to predict a user attention level. The user attention level can then be correlated to an invitational content item type, which can then be used to select an invitational content item for playback.

20 Claims, 10 Drawing Sheets

(51) Int. Cl.
*H04L 29/08* (2006.01)
*H04W 4/02* (2018.01)
*H04W 48/04* (2009.01)

(52) U.S. Cl.
CPC .............. *H04L 67/22* (2013.01); *H04L 67/26* (2013.01); *H04W 4/027* (2013.01); *H04W 48/04* (2013.01)

(56) References Cited

U.S. PATENT DOCUMENTS

| | | | |
|---|---|---|---|
| 7,633,076 B2* | 12/2009 | Huppi | H04M 1/72563 250/559.36 |
| 7,764,641 B2* | 7/2010 | Pelton | H04W 4/027 370/328 |
| 7,805,129 B1* | 9/2010 | Issa | H04N 21/41407 370/310 |
| 8,040,233 B2 | 10/2011 | Adappa et al. | |
| 8,776,111 B1* | 7/2014 | Eldering | H04H 60/66 705/14.49 |
| 9,426,242 B2* | 8/2016 | Pitschel | H04L 65/1089 |
| 9,607,319 B2* | 3/2017 | Forsblom | G06F 3/011 |
| 10,055,756 B2* | 8/2018 | Greenzeiger | G06Q 30/0251 |
| 2001/0037355 A1* | 11/2001 | Britt, Jr. | H04L 67/02 709/201 |
| 2002/0052925 A1 | 5/2002 | Kim et al. | |
| 2002/0068525 A1* | 6/2002 | Brown | H04H 60/06 455/3.01 |
| 2002/0119789 A1* | 8/2002 | Friedman | H04W 4/029 455/456.6 |
| 2003/0120541 A1* | 6/2003 | Siann | G06Q 30/0267 705/14.47 |
| 2004/0002972 A1 | 1/2004 | Pather et al. | |
| 2004/0128359 A1 | 7/2004 | Horvitz | |
| 2004/0255148 A1 | 12/2004 | Monteiro et al. | |
| 2005/0192861 A1* | 9/2005 | Nakazawa | G06F 16/9535 705/14.53 |
| 2006/0242010 A1* | 10/2006 | Crolley | G06Q 30/02 705/14.64 |
| 2007/0244750 A1* | 10/2007 | Grannan | G06Q 30/0267 705/14.64 |
| 2008/0163312 A1 | 7/2008 | Faust et al. | |
| 2008/0307454 A1* | 12/2008 | Ahanger | G06Q 30/02 725/36 |
| 2009/0158423 A1* | 6/2009 | Orlassino | G06F 21/32 726/19 |
| 2009/0163227 A1* | 6/2009 | Collins | G06Q 30/0261 455/456.3 |
| 2009/0232480 A1* | 9/2009 | Jendbro | H04N 5/772 386/224 |
| 2009/0303204 A1* | 12/2009 | Nasiri | G06F 3/0346 345/184 |
| 2010/0035656 A1* | 2/2010 | Pan | G06F 1/1684 455/566 |
| 2010/0036711 A1* | 2/2010 | Shenfield | G06Q 30/0267 705/14.64 |
| 2010/0042470 A1* | 2/2010 | Chang | G06Q 30/0241 705/14.64 |
| 2010/0070926 A1* | 3/2010 | Abanami | G06F 1/1626 715/835 |
| 2010/0114697 A1* | 5/2010 | Athsani | G06Q 30/02 705/14.49 |
| 2010/0138416 A1* | 6/2010 | Bellotti | G06F 16/436 707/736 |
| 2010/0153395 A1* | 6/2010 | Hannuksela | H04N 21/85406 707/737 |
| 2010/0222046 A1* | 9/2010 | Cumming | G06Q 30/02 455/418 |
| 2010/0332315 A1 | 12/2010 | Kamar et al. | |
| 2011/0039508 A1* | 2/2011 | Lindahl | H04H 40/18 455/230 |
| 2011/0161998 A1 | 6/2011 | Alberth et al. | |
| 2011/0178876 A1* | 7/2011 | Karaoguz | G06Q 30/02 705/14.66 |
| 2011/0208570 A1* | 8/2011 | Kong | G06Q 30/02 705/14.5 |
| 2011/0270679 A1* | 11/2011 | Tziortzis | G06Q 30/02 705/14.58 |
| 2011/0291933 A1* | 12/2011 | Holzer | G06Q 90/00 345/167 |
| 2012/0041767 A1* | 2/2012 | Hoffman | G06Q 10/06 705/1.1 |
| 2012/0117250 A1 | 5/2012 | Santamaria et al. | |
| 2012/0206322 A1* | 8/2012 | Osterhout | G02B 27/0093 345/8 |
| 2012/0289147 A1* | 11/2012 | Raleigh | H04N 21/6547 455/3.06 |
| 2013/0138388 A1* | 5/2013 | Jain | G01P 15/00 702/141 |
| 2013/0170813 A1* | 7/2013 | Woods | H04N 5/765 386/200 |
| 2013/0174187 A1* | 7/2013 | Tan | H04N 21/4524 725/10 |
| 2013/0262657 A1* | 10/2013 | Besehanic | H04H 60/31 709/224 |
| 2013/0275353 A1* | 10/2013 | Ingrassia, Jr. | H04L 65/4084 706/46 |
| 2014/0052541 A1* | 2/2014 | McKinley | H04N 1/32117 705/14.66 |
| 2014/0215086 A1* | 7/2014 | Pitschel | H04L 65/1089 709/231 |
| 2014/0287799 A1* | 9/2014 | Choi | G06F 3/0482 455/566 |
| 2014/0335902 A1* | 11/2014 | Guba | H04W 4/027 455/456.4 |
| 2014/0357312 A1* | 12/2014 | Davis | H04W 4/50 455/550.1 |
| 2015/0052554 A1* | 2/2015 | Iyengar | G06Q 30/0205 725/35 |
| 2015/0058903 A1* | 2/2015 | Iyengar | H04N 21/44222 725/93 |
| 2015/0104146 A1* | 4/2015 | Higuchi | H04N 5/7755 386/234 |
| 2015/0163345 A1* | 6/2015 | Cornaby | G06F 3/0236 345/633 |
| 2015/0168174 A1* | 6/2015 | Abramson | G01C 21/3626 701/408 |

OTHER PUBLICATIONS

International Search Report and Written Opinion from PCT Application No. PCT/US2014/013435 dated Jun. 18, 2014.
International Preliminary Report on Patentability from PCT Application No. PCT/US2014/013435 dated Aug. 4, 2015.

* cited by examiner

DETERMINING AN INVITATIONAL CONTENT ITEM TYPE BASED ON PREDICTED USER ATTENTION

RELATED APPLICATIONS

This application is a Continuation of U.S. application Ser. No. 13/753,461 filed on Jan. 29, 2013, entitled "DETERMINING AN INVITATIONAL CONTENT ITEM TYPE BASED ON PREDICTED USER ATTENTION", of which is hereby incorporated by reference herein in its entirety.

TECHNICAL FIELD

The present technology pertains to presenting invitational content, and more specifically pertains to predicting user engagement in order to select between audio and visual invitational content item types for presentation in a media station on a client device.

BACKGROUND

Many users enjoy consuming content such as music or television shows without having to purchase or maintain a copy of the media items. Traditionally, users accomplished this through radio or television broadcasting. However, many users have turned to more flexible content distribution and consumption models offered through the Internet and portable electronic devices, such as media streaming services. Such services allow a user to stream an individual content sequence to an Internet connected device. While each individual user of the media streaming service is not required to purchase a copy of the media items consumed, the media streaming service is generally required to pay a fee to the content providers. In order to fund a media streaming service a number of new revenue models have been developed, many of which include presenting invitational content, such as advertisements within the media stream. The presentation of invitational content allows a media streaming service to offer the media items to a consumer at a significantly reduced rate or even for free.

Traditionally, invitational content has been presented within a media stream by inserting it between media items or by presenting it overtop of a media item. For example, an audio advertisement may be presented in between two songs, such that playback of the second song is prevented until the audio advertisement completes. In another example, a banner advertisement may be presented across the top or bottom of a television show. In a further example, a video advertisement may be presented so that it takes over the full screen. The type of advertisement presented, e.g. audio, video, or banner, may be strictly dependent upon the type of advertisement provided by the advertiser. Such an arbitrary decision mechanism can result in suboptimal results for all parties. For example, in some situations a user may be more receptive to one type of advertisement over another. Therefore, if an advertisement is presented in the less ideal type, the user may be more likely to ignore the advertisement. Alternatively, if one type of advertisement offers a higher revenue stream for the media station provider, the media station provider may wish to try to present that advertisement type more often. However, such an approach could result in a decreased user experience and dissatisfied advertisers who are unable to realize their advertising goals.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for presenting invitational content within a media channel. A media channel can be a mix of media items and invitational content packages that can be played or executed by a media station player on a client device. At some point during playback of the media station, an invitational content item can be presented. The set of invitational content items eligible for playback can include invitational content items of differing types, such as video and audio invitational content items. In some cases, it can be advantageous to present one type of invitational content item type over another. For example, if a user is not likely to look at the screen of the client device during playback of the invitational content item, then it may be better to present an audio invitational content item.

To select an invitational content item, at least one attention predicting rule can be applied to client device data collected from the client device currently executing the media station player to predict a user attention level. The client device data can include a variety of data points regarding the current state of the client device and/or the media player application that are applicable to determining a user's level of engagement with the client device. The data items can include device type, accelerometer data, gyroscope data, compass data, media player state data, media stream state data, ambient light data, device lock state, or device peripheral connection data. For example, a rule can predict a user attention level of visual attentive when the client device data includes screen unlocked and media player application open in the foreground. In another example, a rule can predict a user attention level of visual attentive when the client device data includes device type portable and device stationary. In a further example, a rule can predict a user attention level of visual attentive when the client device data includes connected to peripheral, device stationary, and at least one of connected to a display or gyroscope data indicating device propped in a dock. In yet another example, a rule can predict a user attention level of visual attentive when the client device data includes media station type is soundtrack. In still another example, a rule can predict a user attention level of audio attentive when the client device data include media station type is fitness or road trip. In another example, a rule can predict a user attention level of visual attentive when the client device data includes at least one of media station entry detected, new media station initiated, or media item skip detected.

Based on the predicted user attention level, an invitational content item type preference can be designated. The designation can be based on a correlation between a user attention level and an invitational content item type. For example, a user attention level of visual attentive can be correlated with a video invitational content item type. In another example, a user attention level of audio attentive can be correlated with an audio invitational content item type. The designated invitational content item type preference can be used as at least one factor in selecting an invitational content item. In some cases, the invitational content item type can be used in prioritizing a plurality of invitational content items.

In some cases, a designated invitational content item type preference can be overridden after analyzing a second set of device data items. For example, a designated invitational content item type of video can be overridden based on a media stream sponsor preference. In another example, a designate invitational content item type of video can be overridden based on an invitational content campaign preference. In a further example, a designated invitational content item type of video can be overridden when an ambient light data item is below a predefined threshold value. In still another example, a designated invitational content item type of video can be overridden when a battery level is below a predefined threshold value.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION

Figure 1:
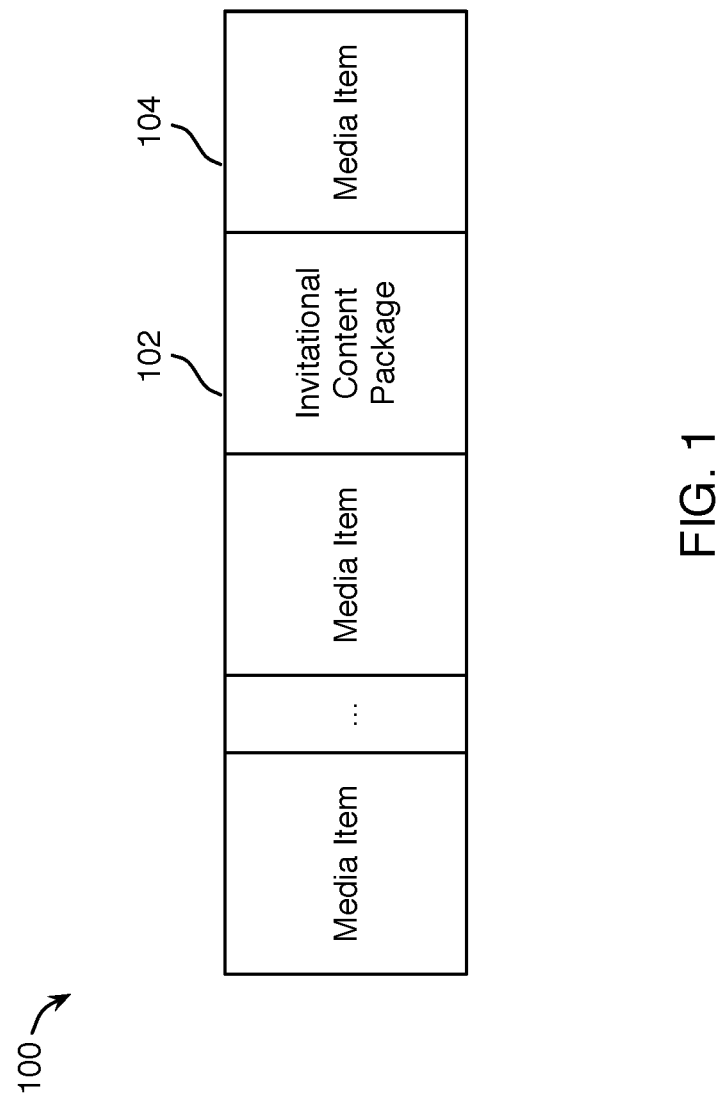
FIG. 1 illustrates an exemplary media channel playback scenario.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for a technique for determining what type of invitational content item, e.g. audio or video, should be presented within a media channel that can be consumed on a client device. A media channel or media station can be a sequence of media items that can be played or executed by a media station player on a client device. Some non-limiting examples of media items can include songs, podcasts, television shows, games, and/or videos. Other media items are also possible. The media station player can be any application capable of media item playback, such as a component of a webpage, a plug-in, a client-side application, etc. In some cases, a media station can be a continuous sequence of content such that as one content item completes playback a next item begins. The playback process of a continuous media stream can repeat until a user takes an action to terminate or temporarily delay the playback, such as quitting the application, switching to a different media station, pausing playback, or skipping a media item. However, a media station can also be defined to be a finite sequence of media items. A media station can be homogeneous or heterogeneous. That is, a media station can be designed to playback media items all of the same media type or of different media types. For example, a homogeneous media station can playback only audio media items or only video media items. In another example, a heterogeneous media station can playback a mix of audio media items and video media items.

A media station can also be configured to play invitational content, such as advertisements, within the media stream. An invitational content item can include content found in a media item, such as a song or a video, but an invitational content item can also include targeted content and/or content designed to elicit a response from a user. Therefore, an invitational content item and a media item can be distinct item types, each of which can be presented in a media station. The invitational content can be used as a source of revenue and/or to subsidize a media station so that the media items can be provided to end users free of charge or for a reduced fee. In some cases, one type of invitational content can produce greater revenue than another. For example, an invitational content provider may be charged a higher rate for video invitational content items.

The invitational content can be presented within a media station using a variety of techniques. In some cases, invitational content can be presented to a user in a manner that prevents or blocks the playback of a next media item or a next segment of a media item. For example, upon the completion of the playback of a music item, but before beginning playback of a new music item, an invitational content item can be presented in the media stream. Invitational content can also be displayed in conjunction with a media item or media item representation. For example, an invitational content item can be presented in a banner ad displayed with a music album cover or during the playback of a television show.

Using the disclosed technology it is possible to increase the benefits to invitational content providers, invitational content consumers, and the media station service. An aspect of the disclosed technology that aids in the improvements involves analyzing device data to infer, deduce, or predict whether a user is likely to be actively engaged with the client device or likely to pay attention to the client device, collectively referred to as user attention level. Based on the predicted user attention level an invitational content item type can be selected. A person skilled in the relevant art will recognize that while the disclosure frequently uses only two invitational content item types, i.e. audio and video, to illustrate the disclosed technology, the disclosed technology can be used with additional invitational content item types, such as banner invitational content items.

FIG. 1 illustrates an exemplary media channel playback scenario 100. The media channel can include a mixture of media items and invitational content items. At various points during playback of the media channel, an invitational content item can be presented, such as invitational content item 102. The invitational content item can be presented in response to an invitational content triggering event, which can include launching a media station application; initiating a new media station; completing playback of a media item; activating a particular feature of a user interface, e.g. a predefined screen in the user interface; moving the device in a predefined manner, e.g. detecting movement using an accelerometer; moving the device within a defined distance of a predefined sensor, e.g. a proximity sensor; and/or some other user action, such as pausing for a predetermined period of time or skipping a media item. Furthermore, the invitational content item can be presented in a manner that prevents playback of a next media item, such as media item 104, until all or a predetermined part of the invitational content item completes.

In response to detecting an invitational content item triggering event, one or more invitational content rules or heuristics can be applied to determine whether an invitational content item should be presented, the type of the invitational content item, and/or the actual invitational content item. To determine the type of the invitational content item, the disclosed technology can include one or more attention predicting rules or heuristics. The attention predicting rules can be applied to client device data to predict a user attention level.

Figure 2:
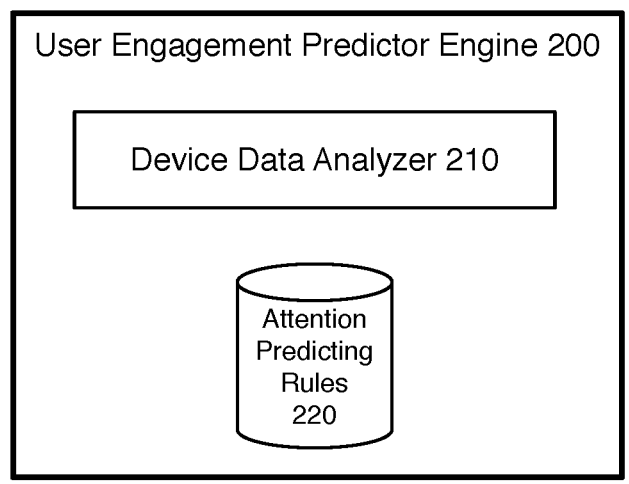
FIG. 2 illustrates an exemplary user engagement predictor engine.

FIG. 2 illustrates exemplary user engagement predictor engine 200. User engagement predictor engine 200 can contain a number of components for predicting a user attention level. The components can include one or more databases for storing data relevant to the operation of the module, e.g. attention predicting rules database 220, and one or more modules for interacting with the databases and/or controlling the features provided by user engagement predictor engine 200, e.g. device data analyzer 210. Each of the components in FIG. 2 is discussed in more detail below; however, it should be understood by one skilled in the art, that the architectural configuration illustrated in FIG. 2 is simply one possible configuration and that other configurations with more or less components is also possible.

User engagement predictor engine 200 can include one or more attention predicting rules for predicting a user attention level. A predicted user attention level can be selected from a set of predefined identifiers. The set of predefined identifiers can be defined with differing levels of granularity based on the configuration of the system. For example, the set of predefined identifiers can be defined to express whether the user is engaged with the client device in an audio or visual manner, e.g. visual attentive, audio attentive, and unknown. In another example, the set of predefined identifiers can be defined to express whether the user is actively engaged with the client device or not, e.g. engaged, not engaged, and unclear. In a further example, the set of predefined identifiers can be defined to differentiate when the user is currently engaged with the client device in a visual manner and when the user may be enticed to engage with the client device in a visual manner, e.g. visually engaged, in visual proximity, and audio engaged. Additional or alternative user attention level identifiers are also possible. Furthermore, the number and/or granularity of the identifiers in the set can also vary.

Each user attention level identifier can be correlated with an invitational content type. For example, the identifiers in the set of visual attentive, audio attentive, and unknown, can correlate to video, audio, and system default type, respectively. In another example, the identifiers in the set of engaged, not engaged, and unclear, can correlate to video, audio, and system default, respectively. In a further example, the set of visually engaged, in visual proximity, and audio engaged, can correlate to video, video, and audio, respectively.

An invitational content type of system default can be defined to be a default type that makes sense for the system, the media player application, or even the media station, depending on the configuration of the system. For example, the system may have a policy of preferring audio invitational content items when the user's level of visual engagement is not known. In another example, if the media station is homogeneous and only includes music items, a default invitational content item type may be audio. However, if the media station is homogeneous and only includes visually based media items, such as videos or television shows, a default invitational content item type may be video. Additionally, instead of system default, the identifiers of unknown or unclear can correlate to a specific type, such as audio.

Attention predicting rules database 220 can be populated with the various attention predicting rules. An attention predicting rule can be applied to a client device data set when the media player application is active such that based on the values in the client device data set a user attention level can be set. For example, an attention predicting rule can be based on the state of the device screen lock when the media player application is active. If the state is locked, the rule can predict that the user attention level is audio attentive, while if the state is unlocked, the rule can predict that the user attention level is visual attentive.

In some cases, an attention predicting rule can be specific to one or more media stations, one or more client device types, or some other client device or media station characteristic, such as whether the client device is connected to a peripheral device. For example, some attention predicting rules may be specific to client devices that are generally stationary, such as desktop computing devices, smart televisions, or set-top boxes. In another example, some station sponsors may require a greater assurance that a user's visual attention is on the client device, and thus some attention predicting rules may be specific to a particular media station. The attention predicting rules can be expressed using a variety of formats and/or file types. For example, an attention predicting rule can be expressed using XML, or some other mark-up language. In another example, an attention predicting rule can be expressed using computer executable instructions, such as javascript.

User engagement predictor engine 200 can also include device data analyzer 210. Device data analyzer 210 can be configured to predict a user attention level, such as visual attentive or audio attentive. To predict a user attention level, device data analyzer 210 can apply one or more attention predicting rules to client device data. The client device data can be obtained from the client device on which the invitational content triggering event occurred. Client device data can include a variety of data points regarding the current state of the client device and/or the media player application, such as device type; accelerometer data; gyroscope data; compass data; media player state data, e.g. open in the foreground; media stream state data, e.g. media station identifier, media item playing, user interactions, etc.; ambient light data; device lock state; battery level data; and/or peripheral connection data. Other client device data relevant to the current state of the device and a user's level of engagement can also be collected and/or used in predicting a user attention level.

Figure 3:
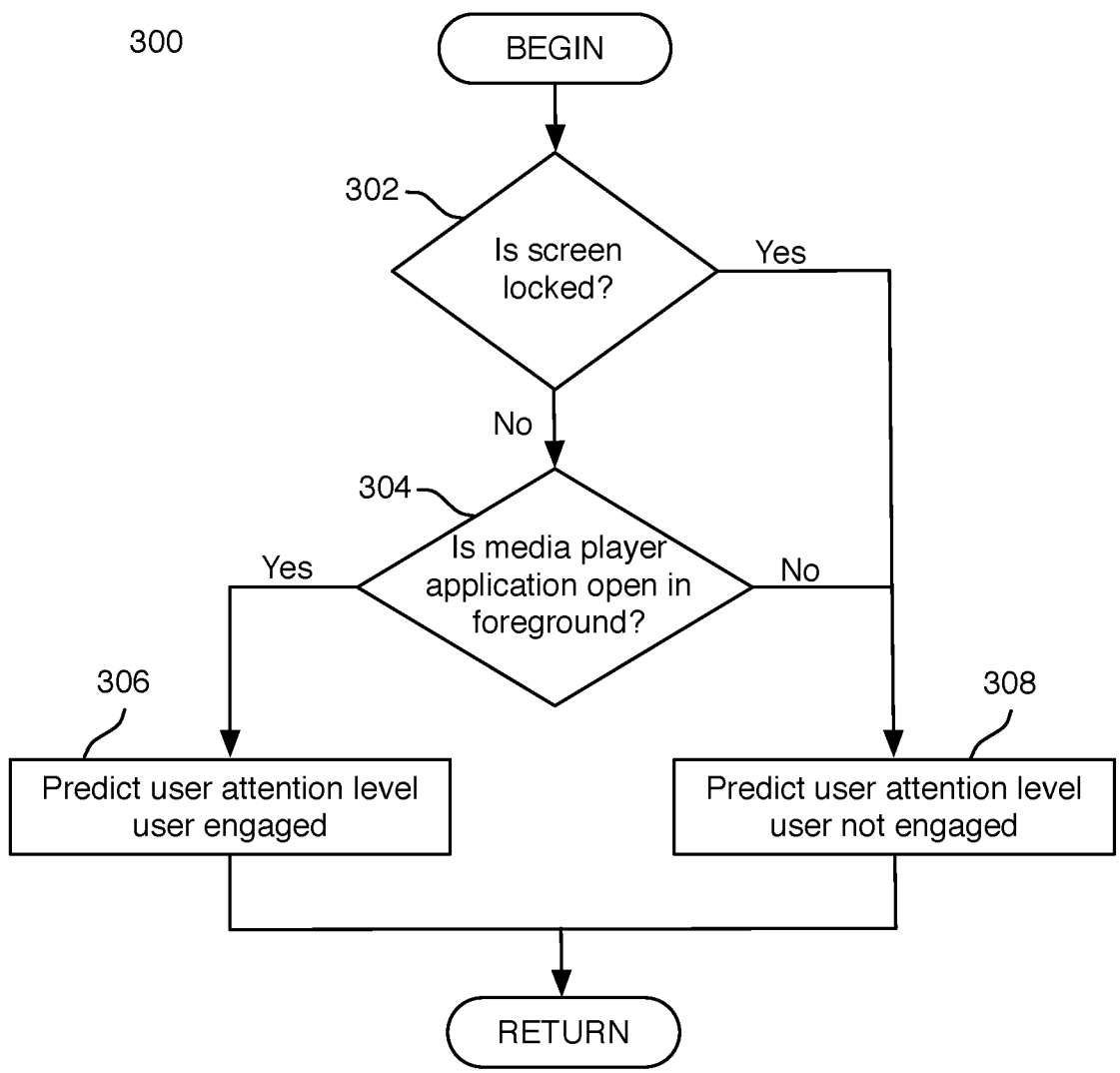
FIG. 3 illustrates a first exemplary attention predicting rule.

User engagement predictor engine 200 can include a variety of attention prediction rules or heuristics, which can be applied to client device data when the media player application is active. Each rule can examine one or more client device data items, such as device type or screen lock state. FIG. 3 illustrates a first exemplary attention predicting rule 300. In rule 300, user engagement predictor engine 200 can use two client device data items to predict a user attention level: screen lock state and media player application state. First, user engagement predictor engine 200 can examine the state of a screen lock data item to check if the screen on the client device is locked (302). If the screen is locked, user engagement predictor engine 200 can predict that the user attention level is user not engaged (308). However, if the screen is not locked, user engagement predictor engine 200 can examine the state of the media player application on the client device to check if the application is open in the foreground (304). If the media player application is open in the foreground, user engagement predictor module 200 can predict that the user attention level is user engaged (306). Alternatively, if the media player application is not open, user engagement predictor module 200 can predict that the user attention level is user not engaged (308).

Figure 4:
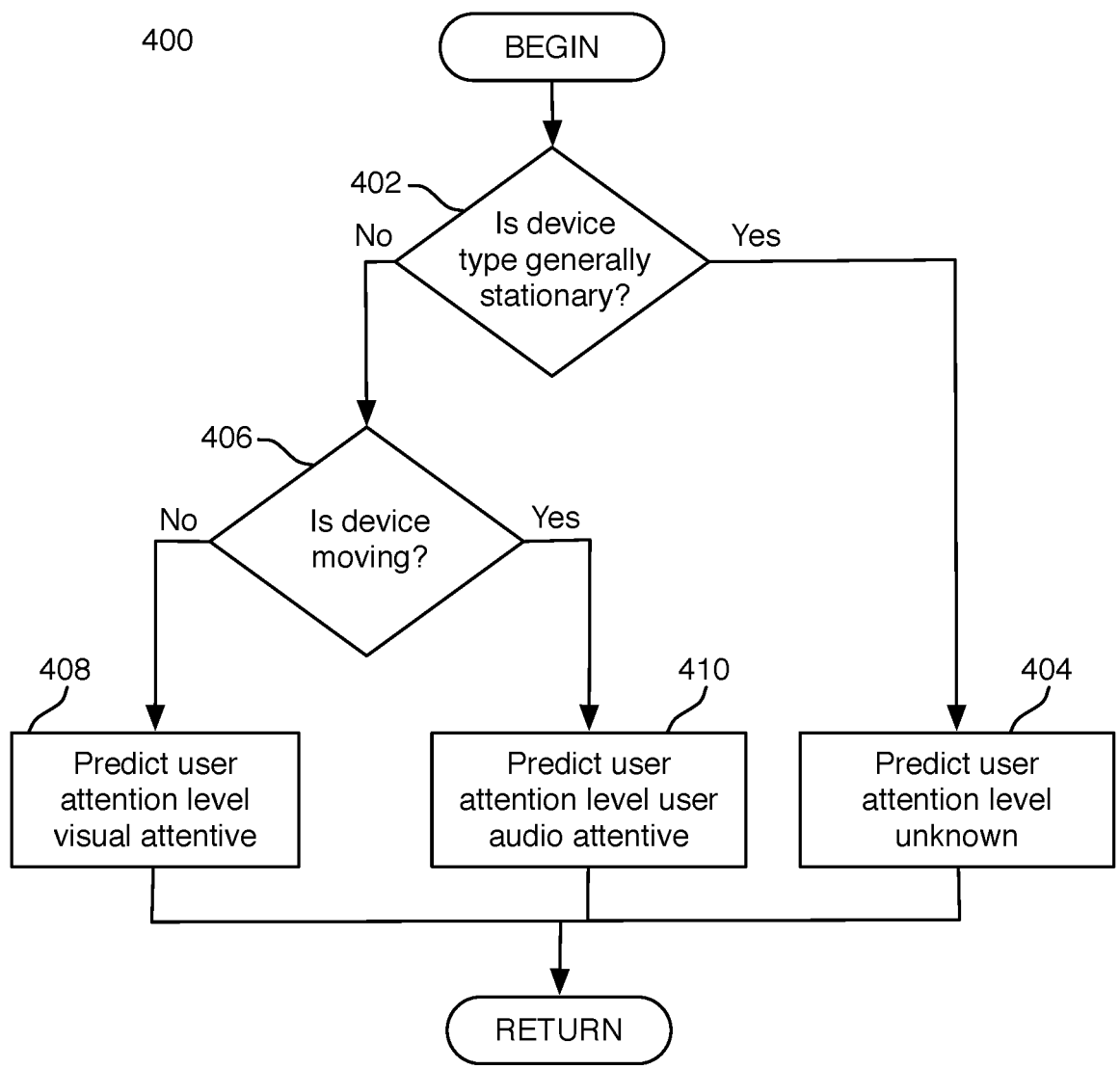
FIG. 4 illustrates a second exemplary attention predicting rule.

FIG. 4 illustrates a second exemplary attention predicting rule 400. In rule 400, user engagement predictor engine 200 can again use two client device data items to predict a user attention level: device type and device movement status. First, user engagement predictor engine 200 can examine the device type to determine if the client device is of a type that is generally stationary (402). For example, user engagement predictor engine 200 can check if the client device type is of a desktop type as opposed to a mobile device type. If the user engagement predictor engine 200 determines the client device is generally stationary, user engagement predictor engine 200 can predict a user attention level of unknown (404). However, if user engagement predictor engine 200 determines the client device has a potential for regular movement, user engagement predictor engine 200 can check if the client device is currently moving (406). For example, data from an accelerometer, gyroscope, and/or compass could indicate that the user of the client device is walking, running, biking, in a car, etc. If user engagement predictor engine 200 determines the client device is moving, user engagement predictor engine 200 can predict that the user attention level is audio attentive (410). Otherwise, user engagement predictor engine 200 can predict that the user attention level is video attentive (408).

Figure 5:
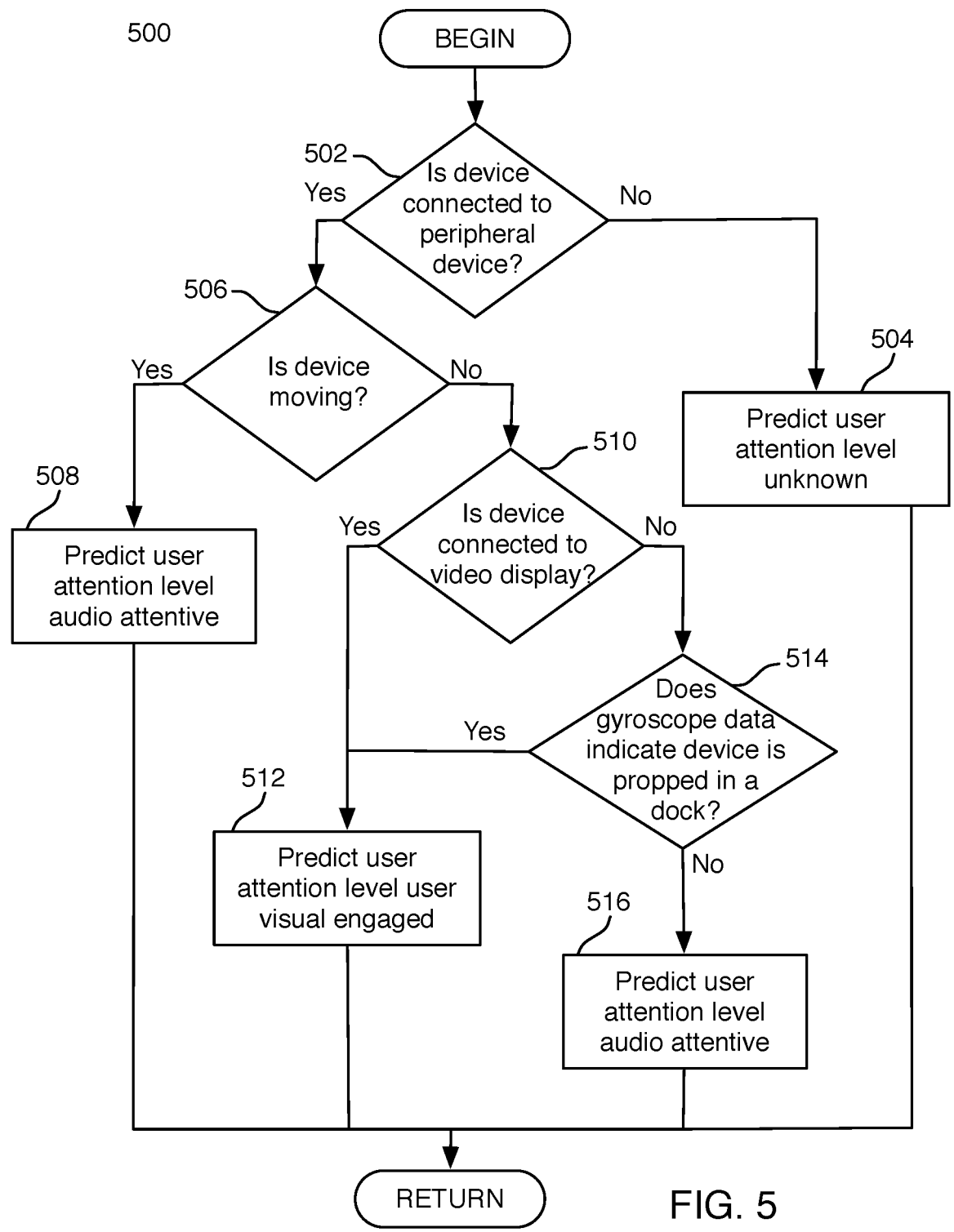
FIG. 5 illustrates a third exemplary attention predicting rule.

FIG. 5 illustrates a third exemplary attention predicting rule 500. In rule 500, user engagement predictor engine 200 can use four client device data items to predict a user attention level: peripheral connection state, device movement status, peripheral type, and gyroscope data. First, user engagement predictor engine 200 can examine the peripheral connection state to determine if the client device is connected to a peripheral device (502). For example, user engagement predictor engine 200 can check if the data indicates the client device is connected to a peripheral device via a Bluetooth connection, a cable, wireless, a dock, or AirPlay from Apple Inc. of Cupertino, Calif. If user engagement predictor engine 200 determines the client device is not connected to a peripheral, user engagement predictor engine 200 can predict a user attention level of unknown (504). However, if user engagement predictor engine 200 determines the client device is connected to a peripheral, user engagement predictor engine 200 can next check if the device is moving (506). For example, data from an accelerometer, gyroscope, and/or compass could indicate that the user of the client device is walking, running, biking, in a car, etc. If user engagement predictor engine 200 determines the client device is moving, user engagement predictor engine 200 can predict that the user attention level is audio attentive (508). However, if user engagement predictor engine 200 determines the client device is not moving, user engagement predictor engine 200 can check if the client device data indicates the client device is connected to a video display (510). If user engagement predictor engine 200 determines the client device is connected to a video display, user engagement predictor engine 200 can predict a user attention level of visual attentive (512). Alternatively, if user engagement predictor engine 200 determines the client device is not connect to a video display, user engagement predictor engine 200 can check if the gyroscope data indicates the client device is propped up in a dock (514). If user engagement predictor engine 200 determines the client device is propped up in a dock, user engagement predictor engine can predict a user attention level of visual attentive (512). Otherwise, user engagement predictor engine 200 can predict a user attention level of audio attentive (516).

Additional attention predicting rules are also possible. For example, a rule can be based on whether the client device data indicates a user is actively skipping tracks. If the user is actively skipping tracks, even if using a remote, the user is engaged with the device. Since the user is actively engaged, the user may be receptive to a video invitational content item type. Therefore, the rule can predict visual attentive in response to client device data that indicates the user is actively skipping tracks. In another example, a rule can be based on whether the media player application just started or started a new media station. In this situation the user is likely still looking at the application and may be receptive to a video invitational content item. Therefore, the rule can predict visual attentive in response to client device data that indicates the media player application just started or started a new media station. In yet another example, a rule can examine motion data, such as data from an accelerometer, gyroscope, and/or compass to determine whether a user is running. If the user is running, the user is not likely to be looking at the screen and thus serving an audio invitational content item may be more advantageous for the invitational content provider. Accordingly, the rule can predict a user attention level of audio attentive in response to data indicating the user is running. In still another example, a rule can be based on the media station content. That is, if a station is fitness oriented or road trip oriented, the rule can predict a user attention level of audio attentive. Alternatively, if the station is soundtrack oriented, the rule can predict a user attention level of video attentive. In a further example, a rule can be specific to a sponsor of a curated media station. That is, the sponsor may pay a different rate in order to guarantee that a particular type of invitational content is presented at specific points during the playback or even at any point during playback. In another example, a rule can be based on the orientation of the device. If gyroscope data indicates that the client device is propped up, such as in a dock or using a smart cover, the rule can predict a user attention level of video attentive. Additionally, rules are also possible, such as rules based strictly on device type.

In some cases, a rule can be based on client device data that can influence a user experience but which does not necessarily indicate whether a user is likely to be engaged with a client device, such as ambient light data or battery level data. For example, a rule can predict a user attention level of audio attentive when the ambient light data indicates the client device is being used in a dark room. This rule can be based on an assumption that playing a video in dark room is disruptive due to the amount of light a video will give off. In another example, a rule can predict a user attentive level of audio when the client device battery level is below a predefined threshold value. This rule can be based on a user experience policy of not wanting to strain the battery once it has reached a certain minimum level.

In some cases, device data analyzer 210 can apply all of the attention predicting rules and combine the results to generate a single predicted user attention level. For example, several predicted user attention levels could be combined by selecting the user attention level value that occurs most frequently. Alternatively, a user attention level of video attentive can be predicted if any of the rules predict video attentive. Additional techniques for combining multiple predicted user attention levels are also possible.

Device data analyzer 210 can also be configured to apply a subset of the attention predicting rules or even just a single rule. For example, if one or more of the attention predicting rules does not apply to the client device or the current media station, device data analyzer 210 may not apply those rules. In another example, device data analyzer 210 may apply a single attention predicting rule based on a best fitting rule, such as device type.

Each client device data item value can be assigned a weight to give it a greater or lesser impact on the predicted user attention level. The weight can be based on a variety of factors, such as the significance of the value and/or the confidence in the accuracy of the value. In some configurations, weights can be used to indicate that the predicted user attention level can be used even if the attention prediction rule was not fully satisfied, so long as the client device data items with the higher weights are satisfied.

Each attention predicting rule or heuristic can also be assigned a weight to give it a greater or lesser impact on the predicted user attention level. For example, if more than one attention predicting rule can be applied to the client device data, device data analyzer 210 could choose the rule with the greatest weight or the top n rules. In some cases, the weight could reflect a degree of accuracy in the prediction. Such a weight could be used to exclude those rules with a weight below a predefined threshold value. For example, an invitational content provider could indicate that their video invitational content item can be presented only in conjunction with user attention levels predicted using rules with a weight above a specified threshold value.

In some configurations, device data analyzer 210 can assign a confidence score to the predicted user attention level. The confidence score can indicate a likelihood that the predicted value is correct. For example, a predicted user attention level can be assigned a confidence score in the range [0,1], where 0 indicates no confidence and 1 indicates full confidence. In another example, a confidence score can be expressed as a percentage, such as 75%. Other relative scales can also be used.

In some cases, confidence scores can be used aid in determining which predicted user attention level should be used. For example, if attention predicting rule 1 predicted a user attention level of audio attentive, while attention predicting rule 2 predicted visual attentive, the conflict can be resolved by using the predicted value with the highest confidence score.

The calculation of a confidence score can depend on a variety of factors. In some configurations, how the client device data items are obtained, the weight assigned to a client device data item, or the number of data items considered in predicting the user attention level can be a factor in the confidence score. The confidence score can also be related to the strength of the attention predicting rule used in predicting the user attention level. In some cases, user engagement predictor engine 200 can be configured with a minimum user attention level confidence score. In cases where a confidence score for a predicted user attention level is not high enough, the predicted user attention level can be disregarded.

Figure 6:
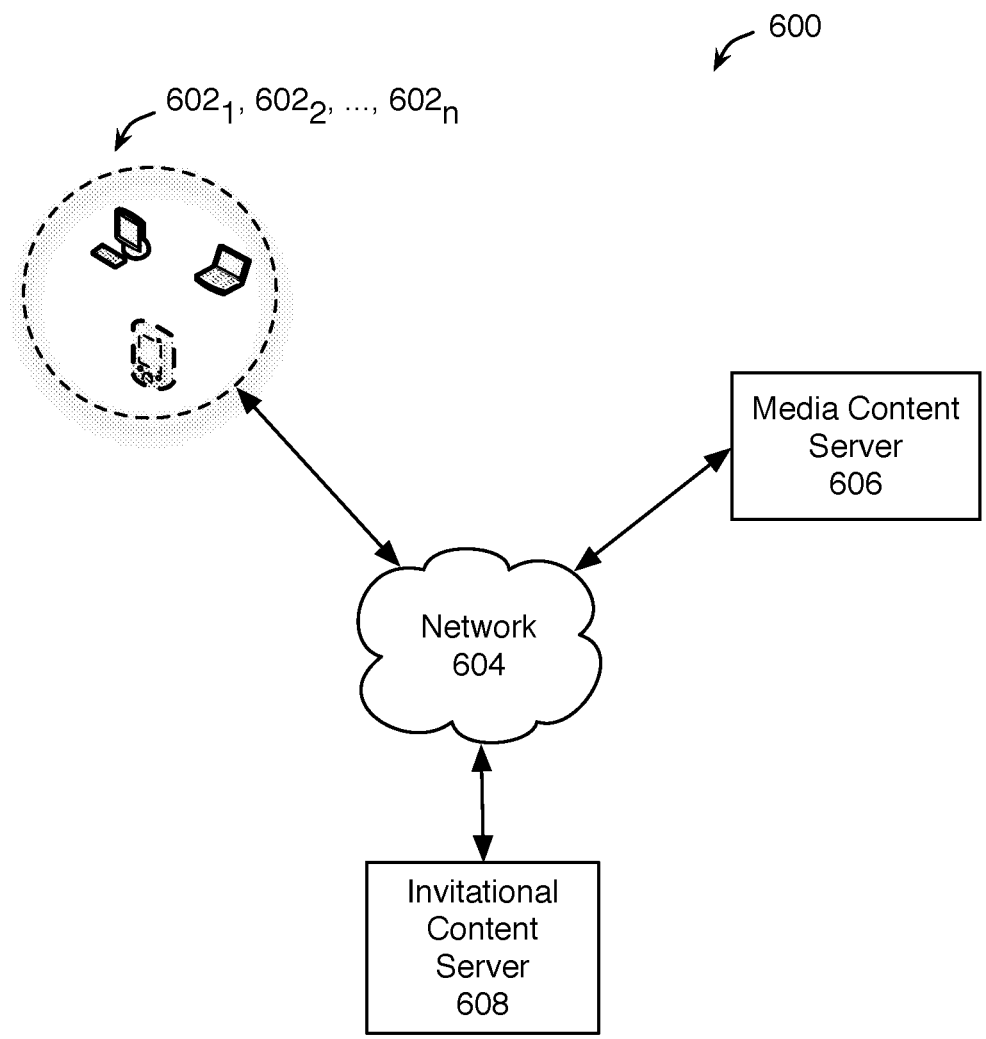
FIG. 6 illustrates an exemplary system configuration for presenting invitational content within a media station.

An exemplary system configuration 600 for presenting invitational content within a media station is illustrated in FIG. 6 wherein electronic devices communicate via a network for purposes of exchanging content and other data. The system can be configured for use on a wide area network, such as that illustrated in FIG. 6. However, the present principles are applicable to a wide variety of network configurations that facilitate the intercommunication of electronic devices. For example, each of the components of system 600 in FIG. 6 can be implemented in a localized or distributed fashion in a network.

In system 600, media items and invitational content items can be delivered to client devices $602_1$, $602_2$, ..., $602_n$ (collectively "602") connected to network 604 by direct and/or indirect communications with media content server 606 and/or invitational content server 608. Client devices 602 can be any network enabled computing devices capable of receiving content for playback within a media channel such as desktop computers; mobile computers; handheld communications devices, e.g. mobile phones, smart phones, tablets; smart televisions; set-top boxes; and/or any other network-enabled computing devices. Furthermore, media content server 606 and/or invitational content server 608 can concurrently accept connections from and interact with multiple client devices 602.

Although media content server 606 and invitational content server 608 are presented herein as separate entities, this is for illustrative purposes only. In some configurations, media content server 606 and invitational content server 608 can be the same entity. Thus, a single entity can provide the media items and the invitational content items. Additionally, system 600 can be configured with multiple media content servers and/or invitational content servers. For example, system 600 can include invitational content servers for different types of content items, e.g. audio, video, banner, etc. Furthermore, in some configurations, a content distribution network can act as an intermediary between client devices 602 and one or more content servers.

In some configurations, a client device can request an invitational content item from a content server at the time that a content item is needed for playback. In this configuration, user engagement predictor engine 200 can be installed on either the content server or the client device. For example, user engagement predictor engine 200 can be installed on the invitational content server and the client device can send client device data along with the request for an invitational content item. User engagement predictor engine 200 can apply one or more attention predicting rules to client device data to predict a user attention level and designate an invitational content item type. The invitational content server can select an invitational content item based at least in part on the designated invitational content item type. Alternatively, user engagement predictor engine 200 can be installed on the client device, such as part of the media player application. In this case, the client can send the predicted user attention level and/or the designated invitational content type to the content server with the request. The invitational content server can then select an invitational content item based at least in part on the received predicted user attention level and/or the designated invitational content type. In some cases, user engagement predictor engine 200 can be installed on the content server regardless of whether it is also installed on client devices. Additionally, whether user engagement predictor engine 200 resides on a client device can be dependent on the type of the client device. For example, user engagement predictor engine 200 may only be installed on client devices with certain processing capabilities.

A system configured such that a client device must request an invitational content item from a content server at the time a content item is needed for playback can create a heavy burden on the client device and can have performance issues when used in situations with less reliable or inconsistent Internet connections. To mitigate these disadvantages, one or more content items and one or more rules can be cached on the client device. The caching makes it possible to shift to the client device at least a portion of the decision-making regarding which content to present and when. In this configuration, a client device can include user engagement predictor engine 200. When needed, the client device can apply one or more attention predicting rules to client device data to predict user attention level and determine an invitational content type. In particular, the present technology can cache a list of one or more invitational content items, each assigned an invitational content item type, and when needed, the client device can predict a user attention level to select an invitational content item with an appropriate type.

Figure 7:
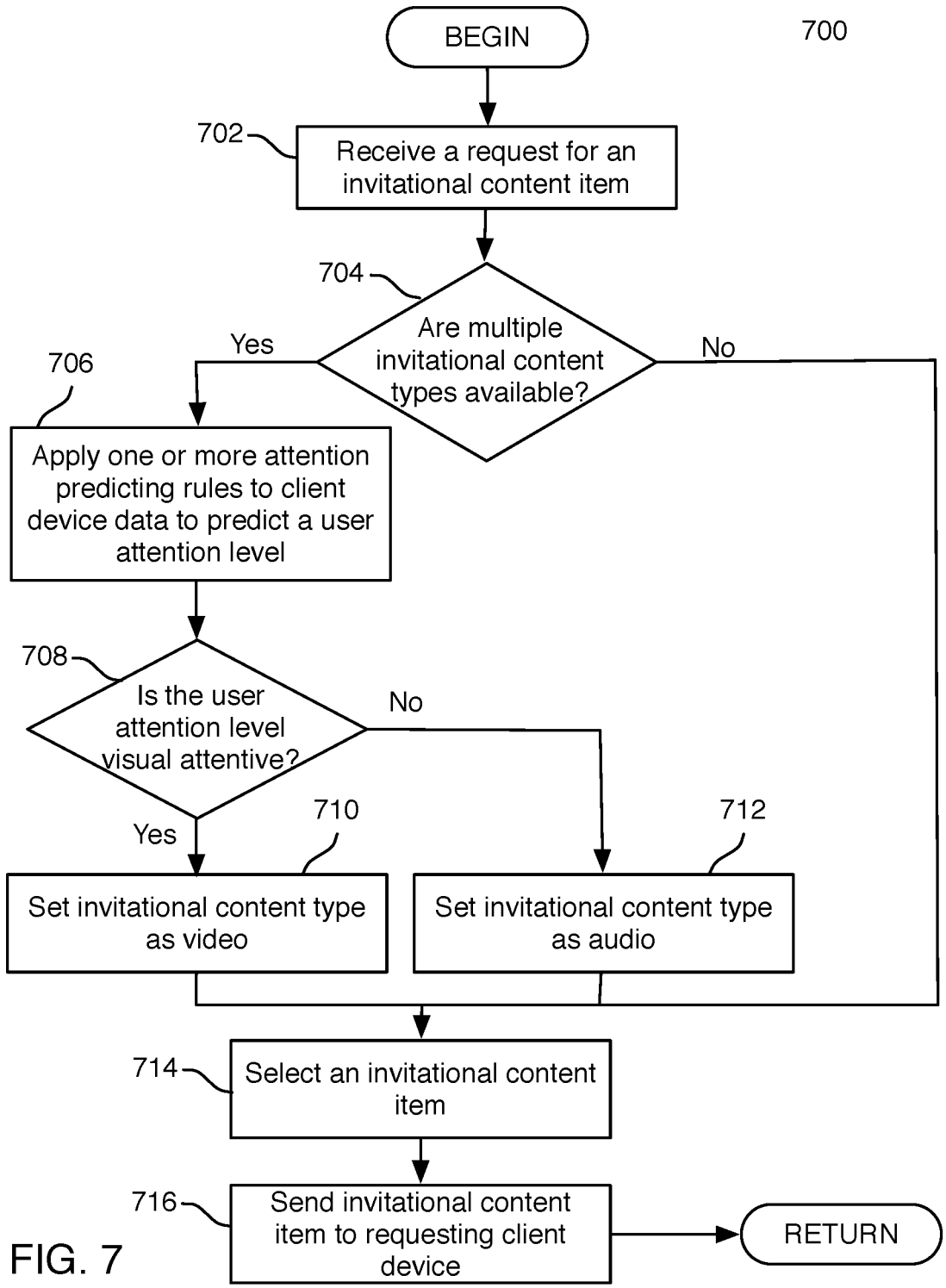
FIG. 7 illustrates an exemplary method embodiment for selecting an invitational content item for presentation within a media channel based on predicted user attention level.

FIG. 7 is a flowchart illustrating steps in exemplary method 700 for selecting an invitational content item for presentation within a media channel based on predicted user attention level. For the sake of clarity, this method is discussed in terms of exemplary user engagement predictor engine 200 in FIG. 2 and exemplary invitational content server 608 in FIG. 6. Although specific steps are shown in FIG. 7, in other embodiments a method can have more or less steps.

At some point during the playback of a media channel, invitational content server 608 configured with user engagement predictor engine 200 can receive a request from client device 602$_i$ for an invitational content item (702). The request can include a set of client device data items. Alternatively, invitational content item server 608 can request the client device data items from requesting client device 602$_i$.

After receiving the request, invitational content server 608 can check if there are eligible invitational content items for client device 602$_i$ with differing invitational content item types (704). For example, invitational content server 608 can determine whether the user is eligible to receive invitational content items of type audio and video. If so, invitational content server 608 can apply one or more attention predicting rules to the received client device data to predict a user attention level (706). The attention predicting rules can be any of the previously discussed rules, such as those in FIGS. 3-5, or any other attention predicting rule. In some cases, invitational content server 608 can assign a confidence score to the predicted user attention level.

After predicting a user attention level, invitational content server 608 can check if the user attention level is visual attentive (708). If so, invitational content server 608 can set an invitational content item type as video (710). Alternatively, invitational content server 608 can set an invitational content item type of banner or visual, which can be used to serve video or other visual invitational content items types. If the user attention level is not visual, invitational content server 608 can set the invitational content item type as audio (712).

After setting an invitational content item type or determining that only one type is currently available to deliver to client device 602$_i$, invitational content server 608 can select an invitational content item (714). The selection can be based on invitational content item type, as well as other factors, such as user characteristics or demographic data. Additionally, the invitational content item type can be used to prioritize invitational content items. For example, the designated invitational content item type can be a factor in a prioritization algorithm. The algorithm can be configured to consider a variety of other factors, such as user characteristics, to identify top candidate invitational content items. Therefore, when using a prioritization algorithm, an invitational content item having a type different than the designated type could be selected if other factors indicate the invitational content item would be a better fit. After sending an invitational content item, invitational content server 608 can resume previous processing, which can include repeating method 700.

Figure 8:
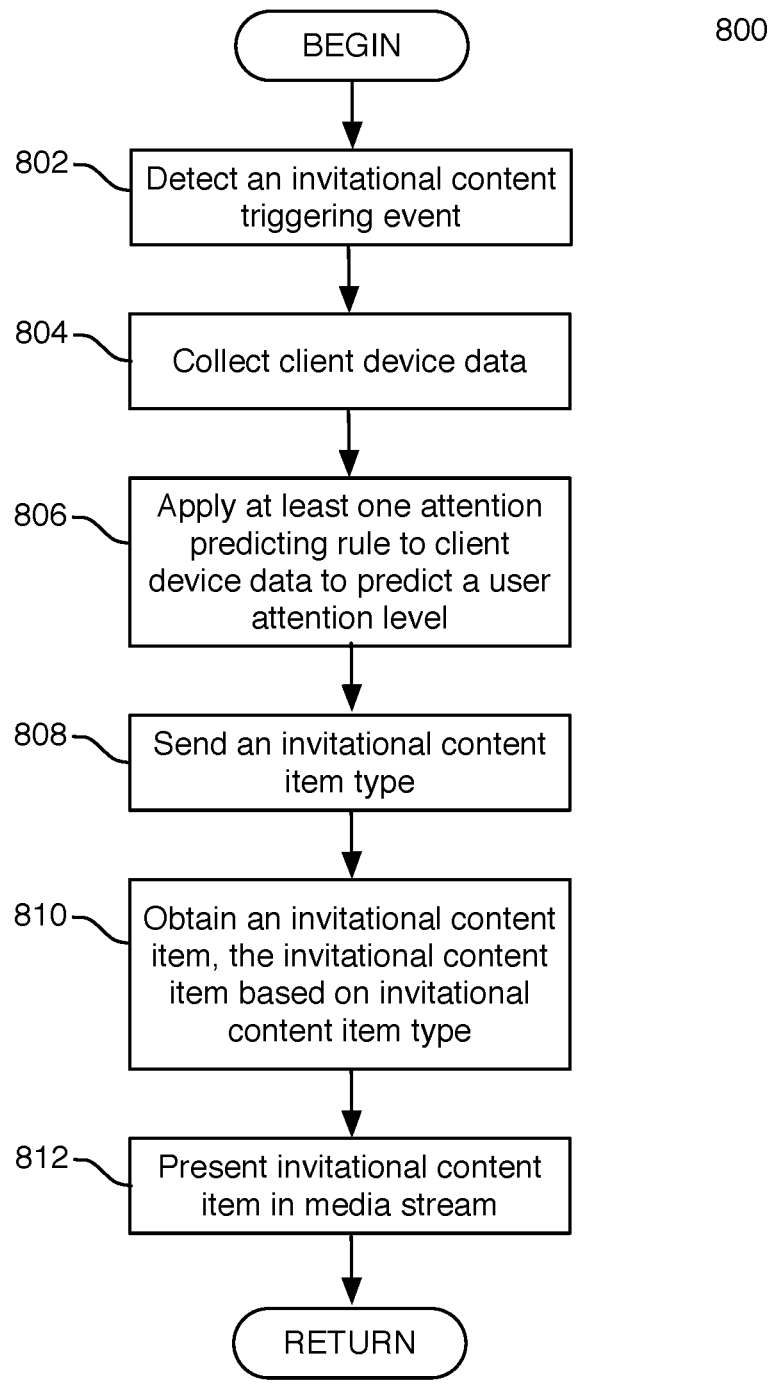
FIG. 8 illustrates an exemplary method embodiment for presenting an invitational content item within a media channel based on predicted user attention level.

FIG. 8 is a flowchart illustrating steps in exemplary method 800 for presenting an invitational content item within a media channel based on predicted user attention level. For the sake of clarity, this method is discussed in terms of exemplary user engagement predictor engine 200 in FIG. 2 and client device 602$_i$ in FIG. 6. Although specific steps are shown in FIG. 8, in other embodiments a method can have more or less steps.

At some point during the playback of a media channel, client device 602$_i$ configured with user engagement predictor engine 200 can detect an invitational content triggering event (802). An invitational content triggering event can include launching a media station application; initiating a new media station; completing playback of a media item; activating a particular feature of a user interface, e.g. a predefined screen in the user interface; moving the device in a predefined manner, e.g. detecting movement using an accelerometer; moving the device within a defined distance of a predefined sensor, e.g. a proximity sensor; and/or some other user action, such as pausing for a predetermined period of time or skipping a media item.

In response to detecting the triggering event, client device 602$_i$ can collect a variety of client device data (804) relevant to the current state of client device 602$_i$. Client device data can include a variety of data points regarding the current state of the client device and/or the media player application, such as device type; accelerometer data; gyroscope data; compass data; media player state data, e.g. open in the foreground; media stream state data, e.g. media station identifier, media item playing, user interactions, etc.; ambient light data; device lock state; battery level data; and/or peripheral connection data. Other client device data relevant to the current state of the device can also be collected.

Client device 602$_i$ can apply at least one attention predicting rule to the collected client device data to predict a user attention level (806). The attention predicting rules can be any of the previously discussed rules, such as those in FIGS. 3-5, or any other attention predicting rule. After predicting a user attention level, client device 602$_i$ can set an invitational content item type (808) based on the predicted user attention level. For example, if the user attention level is visual attentive, client device 602$_i$ can set the invitational content item type as video. In another example, if the predicted user attention level is visually engaged or in visual proximity, client device 602$_i$ can set the invitational content item type as video. In yet another example, if the predicted user attention level is unclear or unknown, client device 602$_i$ can set the invitational content item type to a default value, such as audio or banner. In a further example, if the predicted user attention level is audio attentive or not engaged, client device $602_i$ can set the invitational content item type as audio.

After designating an invitational content item type, client device $602_i$ can obtain an invitational content item based at least in part on the invitational content item type (810). In some cases, client device $602_i$ can obtain the invitational content item by requesting an item from an invitational content server. As part of the request client device $602_i$ can provide the designated invitational content item type. Client device $602_i$ can also be configured to cache invitational content items. In this case, client device $602_i$ can select an invitational content item from the cache using the invitational content item type as a selection factor.

After obtaining an invitational content item, client device $602_i$ can present the invitational content item in the media channel (812). After presenting the invitational content item, client device $602_i$ can resume previous processing, which can include repeating method 800.

Figure 9:
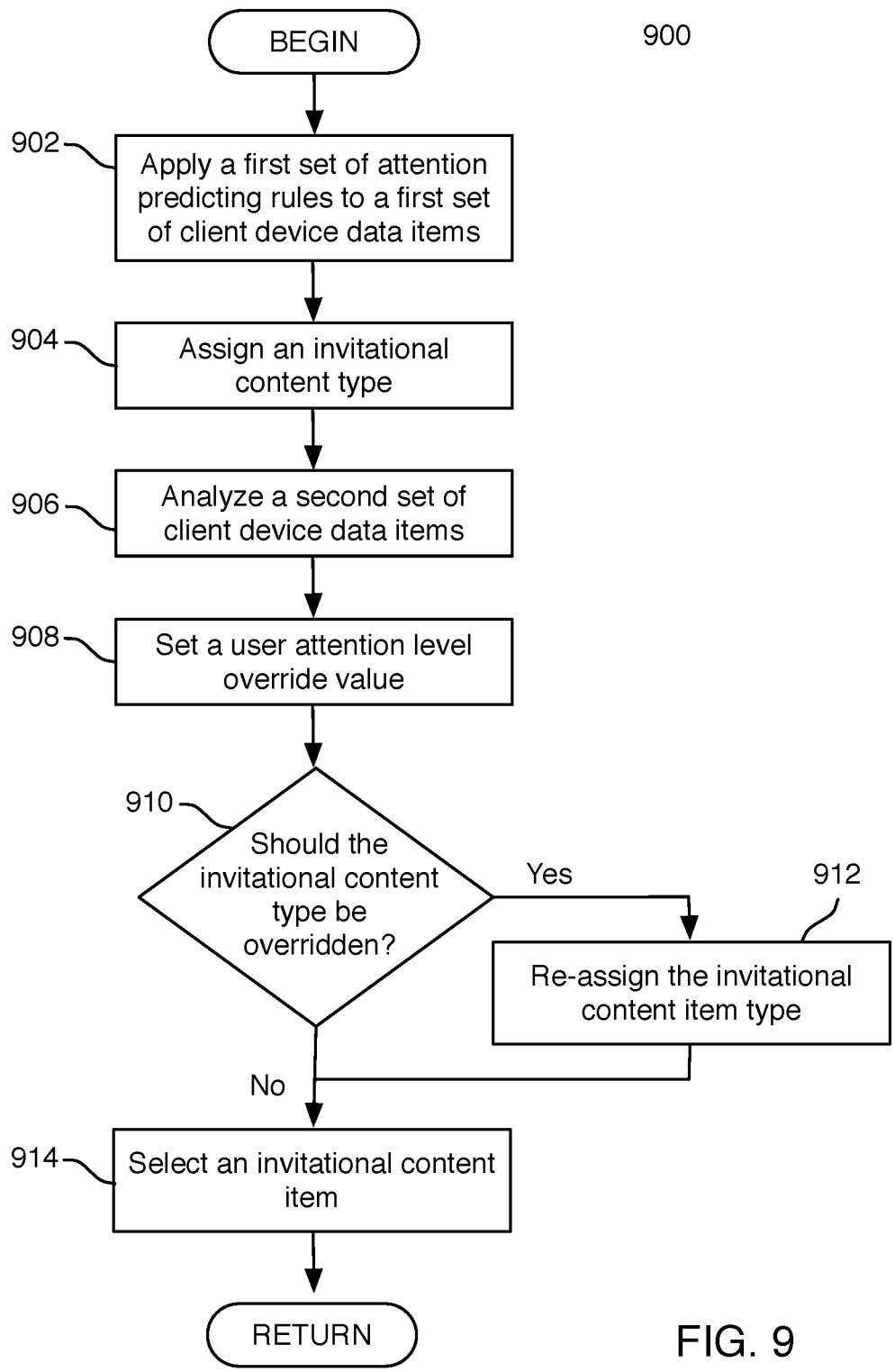
FIG. 9 illustrates an exemplary method embodiment for setting an invitational content item type based on a predicted user attention level and secondary client device data.

FIG. 9 is a flowchart illustrating steps in exemplary method 900 for setting an invitational content item type based on a predicted user attention level and secondary client device data. For the sake of clarity, this method is discussed in terms of exemplary user engagement predictor engine 200 in FIG. 2 and invitational content server 608 in FIG. 6. Although specific steps are shown in FIG. 9, in other embodiments a method can have more or less steps.

At some point invitational content server 608 configured with user engagement predictor engine 200 can apply a first set of attention predicting rules to a first set of client device data items to predict a user attention level (902). The attention predicting rules can be any of the previously discussed rules, such as those in FIGS. 3-5, or any other attention predicting rule. After predicting a user attention level, invitational content server 608 can set an invitational content item type based on the predicted user attention level (904). For example, if the predicted user attention level is visual attentive, invitational content server 608 can set an invitational content type of video. In another example, if the predicted user attention level is audio attentive, invitational content server 608 can set an invitational content type of audio.

Invitational content server 608 can also analyze a second set of client device data items (906). The second set of client device data items can be data that may influence a user experience but which does not necessarily indicate whether a user is likely to be engaged with a client device, such as ambient light data or battery level data. Based on the analysis of the second set of client device data items, invitational content server 608 can set a user attention level override value (908). For example, if invitational content server 608 determines from the ambient light data that the light in the room is below a predefined threshold value, invitational content server 608 can set the user attention level override value as override video. In another example, if invitational content server 608 determines from the battery level data that the battery level is below a predefined threshold, e.g. 20 percent, invitational content server 608 can set the user attention level override value as override video. An analysis of the second set of client device data items can also result in setting the user attention level override value as override audio.

After setting the user attention level override value, invitational content server 608 can check if the invitational content type should be overridden (910). If the invitational content type should be overridden, invitational content server 608 can re-assign the invitational content type (912). For example, if the invitational content item type is video and the user attention level override value is override video, invitational content server 608 can set the invitational content type as audio. In another example, if the invitational content item type is video and the user attention level override value is override video, invitational content server 608 can set the invitational content type as banner. An audio invitational content type can also be overridden to be video, such as when media station data indicates a video should be played, a media station sponsor has expressed a preference of video, or an invitational content campaign preference.

If the invitational content type should not be overridden or after re-assigning the invitational content type, invitational content server 608 can select an invitational content item based at least in part on the invitational content item type (914). After selecting the invitational content item, invitational content server 608 can resume previous processing, which can include repeating method 900.

Figure 10A:
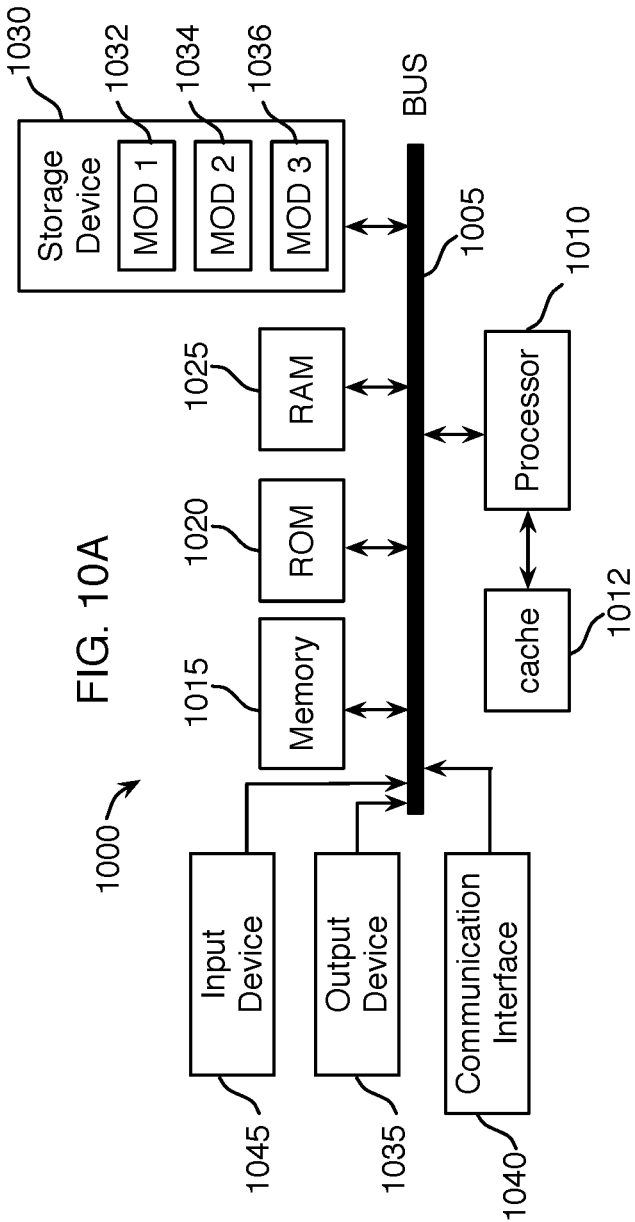
FIG. 10A and FIG. 10B illustrate exemplary system embodiments.
Figure 10B:
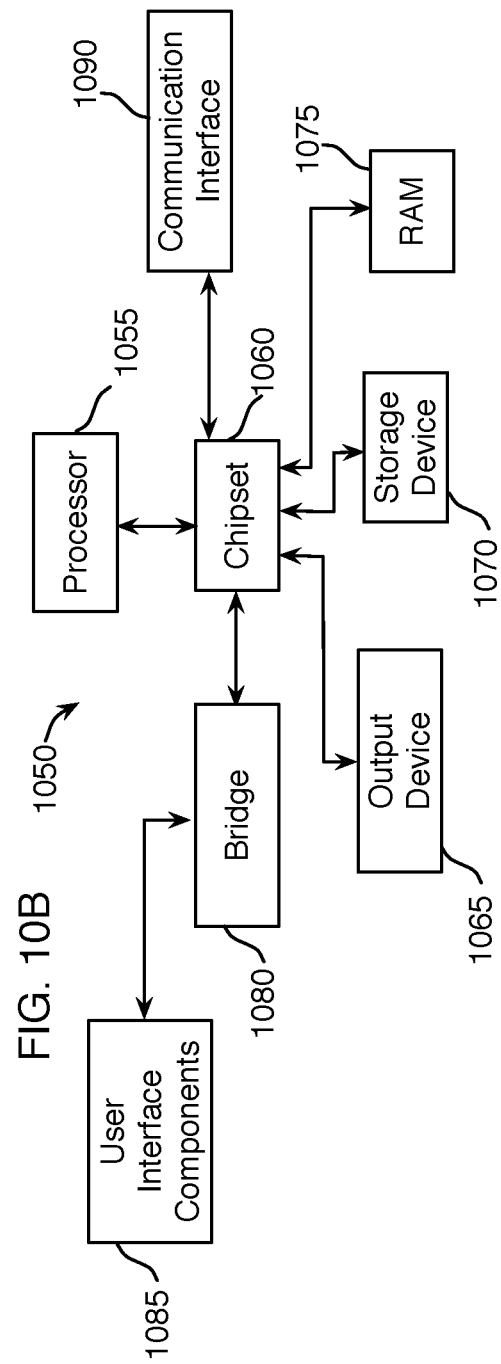

FIG. 10A, and FIG. 10B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 10A illustrates a conventional system bus computing system architecture 1000 wherein the components of the system are in electrical communication with each other using a bus 1005. Exemplary system 1000 includes a processing unit (CPU or processor) 1010 and a system bus 1005 that couples various system components including the system memory 1015, such as read only memory (ROM) 1020 and random access memory (RAM) 1025, to the processor 1010. The system 1000 can include a cache of high-speed memory connected directly with, in close proximity to, or integrated as part of the processor 1010. The system 1000 can copy data from the memory 1015 and/or the storage device 1030 to the cache 1012 for quick access by the processor 1010. In this way, the cache can provide a performance boost that avoids processor 1010 delays while waiting for data. These and other modules can control or be configured to control the processor 1010 to perform various actions. Other system memory 1015 may be available for use as well. The memory 1015 can include multiple different types of memory with different performance characteristics. The processor 1010 can include any general purpose processor and a hardware module or software module, such as module 1 1032, module 2 1034, and module 3 1036 stored in storage device 1030, configured to control the processor 1010 as well as a special-purpose processor where software instructions are incorporated into the actual processor design. The processor 1010 may essentially be a completely self-contained computing system, containing multiple cores or processors, a bus, memory controller, cache, etc. A multi-core processor may be symmetric or asymmetric.

To enable user interaction with the computing device 1000, an input device 1045 can represent any number of input mechanisms, such as a microphone for speech, a touch-sensitive screen for gesture or graphical input, keyboard, mouse, motion input, speech and so forth. An output device 1035 can also be one or more of a number of output mechanisms known to those of skill in the art. In some instances, multimodal systems can enable a user to provide multiple types of input to communicate with the computing device 1000. The communications interface 1040 can generally govern and manage the user input and system output. There is no restriction on operating on any particular hardware arrangement and therefore the basic features here may easily be substituted for improved hardware or firmware arrangements as they are developed.

Storage device 1030 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1025, read only memory (ROM) 1020, and hybrids thereof.

The storage device 1030 can include software modules 1032, 1034, 1036 for controlling the processor 1010. Other hardware or software modules are contemplated. The storage device 1030 can be connected to the system bus 1005. In one aspect, a hardware module that performs a particular function can include the software component stored in a computer-readable medium in connection with the necessary hardware components, such as the processor 1010, bus 1005, display 1035, and so forth, to carry out the function.

FIG. 10B illustrates a computer system 1050 having a chipset architecture that can be used in executing the described method and generating and displaying a graphical user interface (GUI). Computer system 1050 is an example of computer hardware, software, and firmware that can be used to implement the disclosed technology. System 1050 can include a processor 1055, representative of any number of physically and/or logically distinct resources capable of executing software, firmware, and hardware configured to perform identified computations. Processor 1055 can communicate with a chipset 1060 that can control input to and output from processor 1055. In this example, chipset 1060 outputs information to output 1065, such as a display, and can read and write information to storage device 1070, which can include magnetic media, and solid state media, for example. Chipset 1060 can also read data from and write data to RAM 1075. A bridge 1080 for interfacing with a variety of user interface components 1085 can be provided for interfacing with chipset 1060. Such user interface components 1085 can include a keyboard, a microphone, touch detection and processing circuitry, a pointing device, such as a mouse, and so on. In general, inputs to system 1050 can come from any of a variety of sources, machine generated and/or human generated.

Chipset 1060 can also interface with one or more communication interfaces 1090 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 1055 analyzing data stored in storage 1070 or 1075. Further, the machine can receive inputs from a user via user interface components 1085 and execute appropriate functions, such as browsing functions by interpreting these inputs using processor 1055.

It can be appreciated that exemplary systems 1000 and 1050 can have more than one processor 1010 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implemented method comprising:
transmitting a media stream to a client device for playback via a media player on the client device;
determining one or more operating states of the client device;
determining a format of media content for insertion into the media stream, wherein the format comprises a video format when the client device has a first connectivity status and a first operating state, and wherein the format comprises an audio format when the client device has a second connectivity status that is different than the first connectivity status and a second operating state that is different than the first operating state, wherein one of the first connectivity status or the second connectivity status comprises connectivity between the client device and at least one of a peripheral device, a video display, or a dock;

after determining the format, selecting, from a plurality of media content items having the format, a media content item for insertion into the media stream; and inserting the media content item having the format into the media stream transmitted to the client device.

2. The method of claim 1, wherein determining the format comprises:

determining the video format;

overriding the video format when an ambient light is below a predefined threshold; and re-assigning the format of media content determined to the audio format.

3. The method of claim 1, wherein the format is the video format when the first connectivity status comprises connectivity between the client device and the at least one of the peripheral device, the video display, or the dock and the second connectivity does not comprise connectivity between the client device and the at least one of the peripheral device, the video display, or the dock.

4. The method of claim 1, wherein the one or more operating states of the client device comprise at least one of a screen lock state or a battery state.

5. The method of claim 1, wherein the format is the audio format when the second operating state comprises a screen lock state, wherein the screen lock state comprises a locked screen associated with the client device.

6. The method of claim 1, wherein the format is the audio format when the second operating state comprises a battery state indicating that a battery level is below a threshold battery level.

7. The method of claim 1, wherein the one or more operating states comprise a particular playback status of the media stream at the client device.

8. The method of claim 1, wherein the format is the video format when the first operating state comprises device activity resulting from a user interaction with the client device.

9. The method of claim 8, wherein the user interaction comprises at least one of pausing the playback of the media stream via the media player, resuming the playback of the media stream via the media player, stopping the playback of the media stream via the media player, or requesting playback content via the media player.

10. The method of claim 1, wherein one of the first operating state or the second operating state comprises a media player operating status, the media player operating status indicating that the media player is either inactive or running in a foreground.

11. The method of claim 1, wherein the format is the video format when the first operating state indicates that the media player is running in a foreground.

12. A system, comprising:

a processor; and a computer-readable storage medium having stored therein instructions which, when executed by the processor, cause the processor to perform operations comprising:

obtaining a media stream for playback via a media player on a client device;

determining one or more operating states of the client device;

determining a format of media content for insertion into the media stream for playback at the client device, wherein the format comprises a video format when the client device has a first connectivity status and a first operating state, and wherein the format comprises an audio format when the client device has a second connectivity status that is different than the first connectivity status and a second operating state that is different than the first operating state, wherein one of the first connectivity status or the second connectivity status comprises connectivity between the client device and at least one of a peripheral device, a video display, or a dock;

after determining the format, selecting, from a plurality of media content items having the format, a media content item for insertion into the media stream; and inserting the media content item having the format into the media stream.

13. The system of claim 12, wherein determining the format comprises:

determining the video format;

overriding the video format when an ambient light is below a predefined threshold; and re-assigning the format of media content determined to the audio format.

14. The system of claim 12, wherein the format is the video format when the first connectivity status comprises connectivity between the client device and the at least one of the peripheral device, the video display, or the dock and the second connectivity does not comprise connectivity between the client device and the at least one of the peripheral device, the video display, or the dock.

15. The system of claim 12, wherein the one or more operating states of the client device comprise at least one of a screen lock state or a battery state.

16. The system of claim 12, wherein the format is the audio format when the second operating state comprises a screen lock state, wherein the screen lock state comprises a locked screen associated with the client device.

17. The system of claim 12, wherein the selected format is the audio format when the second operating state comprises a battery state indicating that a battery level is below a threshold battery level.

18. A non-transitory computer-readable storage medium having stored therein instructions which, when executed by a processor, cause the processor to perform operations comprising:

transmitting a media stream to a client device for playback via a media player on the client device;

determining one or more operating states of the client device;

determining a format of media content for insertion into the media stream, wherein the format comprises a video format when the client device has a first connectivity status and a first operating state, and wherein the format comprises an audio format when the client device has a second connectivity status that is different than the first connectivity status and a second operating state that is different than the first operating state, wherein one of the first connectivity status or the second connectivity status comprises connectivity between the client device and at least one of a peripheral device, a video display, or a dock;

after determining the format, selecting, from a plurality of media content items having the format, a media content item for insertion into the media stream; and inserting the media content item having the format into the media stream transmitted to the client device.

19. The non-transitory computer-readable storage medium of claim 18, wherein the format is the video format when the first operating state comprises device activity resulting from a user interaction, wherein the user interaction comprises at least one of pausing the playback of the media stream via the media player, resuming the playback of the media stream via the media player, stopping the playback of the media stream via the media player, or requesting playback content via the media player.

20. The non-transitory computer-readable storage medium of claim 18, wherein the format is the video format when the first operating state comprises a media player operating status indicating that the media player is running in a foreground.

\* \* \* \* \*